UNITED STATES PATENT OFFICE.

DANIEL VORLÄNDER, OF HALLE-ON-THE-SAALE, HENRY STALAY ARTHUR HOLT, OF LUDWIGSHAFEN, AND HEINRICH WEISSBRENNER, OF HALLE-ON-THE-SAALE, GERMANY, ASSIGNORS TO THE BADISCHE ANILIN AND SODA FABRIK, OF LUDWIGSHAFEN, GERMANY.

PROCESS OF MAKING INDOXYL BODIES.

SPECIFICATION forming part of Letters Patent No. 651,453, dated June 12, 1900.

Application filed April 10, 1900. Serial No. 12,365. (No specimens.)

*To all whom it may concern:*

Be it known that we, DANIEL VORLÄNDER, privat docent, a subject of the King of Prussia, Emperor of Germany, residing at Halle-on-the-Saale, HENRY STALAY ARTHUR HOLT, doctor of philosophy, a subject of the Queen of Great Britain and Ireland, residing at Ludwigshafen-on-the-Rhine, and HEINRICH WEISSBRENNER, pharmaceutical chemist, a subject of the King of Saxony, residing at Halle-on-the-Saale, Germany, have invented new and useful Improvements in the Manufacture of Indoxyl Bodies, of which the following is a specification.

We have discovered that the dialkyl esters of phenyl-glycocol-ortho-carboxylic acid can be readily combined with acetyl or similar acid radicals, such as formyl, benzoyl, and the like. The new acyl derivatives thus obtained are most readily converted into indoxyl compounds which can readily be oxidized to indigo. This conversion cannot only be effected by the action of caustic alkalies, but also by heating with dilute alkaline solutions. Besides the caustic alkalies the alkaline earths, the alkaline alcoholates, ammonia, hot soda solution, and sulfuric acid of approximately mono-hydrate strength are capable of effecting the conversion. The result of the treatment is the production of indoxyl bodies—namely, indoxyl itself or indoxylic acid—or when alcoholates are used in the presence of alcohol or benzene indoxylic acid ester is obtained. If sulfuric acid mono-hydrate be used, the indoxyl compound obtained becomes sulfonated and oxidized, so that indigo-sulfoacids are obtained.

The following examples will serve to further illustrate the nature of the invention; but the invention is not confined to the examples. The parts are by weight.

*Example 1. Production of the acetyl derivative of phenyl-glycocol-carboxylic acid di-ethyl ester.*—Mix together three (3) parts of phenyl-glycocol-ortho-carboxylic acid di-ethyl ester, fifteen (15) parts of acetic anhydride, and one (1) part of sodium acetate free from water. Heat the mixture for five hours at its boiling-point, then distil off the excess of acetic anhydride, and pour the reaction mass into a dilute solution of soda kept cold by ice. The new acetyl compound separates out as a light-brown mass. Purify, if necessary, by dissolving in ether and treating with animal charcoal.

Instead of ethyl ester used in the above example the equivalent quantity of other esters of the acid—for instance, the methyl ester—can be employed. Instead of acetic anhydride acetyl chlorid can be used, for instance, at the temperature of the water-bath.

*Example 2. Production of the formyl derivative of phenyl-glycocol-ortho-carboxylic acid di-ethyl ester.*—Mix together in a closed vessel one (1) part of the said ester and two (2) parts of formic acid containing ninety per cent. of real acid. Heat the mixture from one to two hours at a temperature of about 150° centigrade. Allow the mixture to cool, filter, and evaporate in vacuum. Dissolve the residue in ether and shake it out with soda solution. Distil off the ether from the ethereal solution and the desired formyl compound remains. The new formyl compound so obtained is very easily soluble in organic solvents and shows little tendency to crystallize.

*Example 3. The production of the benzoyl derivative of phenyl-glycocol-ortho-carboxylic acid di-ethyl ester.*—Mix together about ten (10) parts of phenyl-glycocol-ortho-carboxylic di-ethyl ester and twenty (20) parts of benzoyl chlorid. Heat the mixture for about half an hour on the water-bath until the evolution of hydrochloric acid has ceased. Distil off the excess of benzoyl chlorid by means of steam, dissolve the residue in ether, shake out the ethereal solution with soda solution in order to remove the benzoic acid, dry the ethereal solution, and distil off the ether. The benzoyl-phenyl-glycocol-ortho-carboxylic acid di-ethyl ester is thus obtained as a thick oil which cannot be distilled, even at a very low pressure, without decomposition.

*Example 4. Production of ethoxy-carboxyl-phenyl-glycocol-ortho-carboxylic acid di-ethyl ester.*—Mix together twenty-seven (27) parts of phenyl-glycocol-ortho-carboxylic acid diethyl ester and eleven (11) parts of chloroformic acid ethyl ester. Heat the mixture on the water-bath until the development of hydrochloric acid ceases. The melted mass soon solidifies. Treat this with water and with a cold dilute solution of carbonate of soda. The desired acylated ester remains undissolved in an almost-pure condition. It dissolves most readily in the usual organic solvents and can be boiled without decomposition at a temperature above 360° centigrade.

*Example 5. Conversion of the new acetyl compounds into indoxyl by means of alkali.*—Mix one (1) part of the acetyl ester obtained according to the foregoing Example 1 with ten (10) parts of caustic soda solution containing about twenty per cent. NaOH. Boil the mixture for about half an hour in a vessel provided with an inverted condenser, preferably excluding the air as far as possible. Allow the solution to cool and precipitate indoxyl from it unless it is desired to convert it directly into indigo by oxidation. If more concentrated caustic soda be taken, (for instance, one containing about thirty-five per cent. NaOH,) the yield of indoxyl is diminished as the esters are saponified; but, on the other hand, if the acyl ester be treated with solid caustic soda at the temperature of the water-bath favorable results are once more obtained. Instead of caustic-soda lye caustic-potash solution, milk of lime, or baryta water can be used. The reaction proceeds not only on boiling with alkalies, but also if the cold aqueous solutions are allowed to stand for a long time. The condensation can also be effected by means of metallic sodium or sodium ethylate, and in the latter case either by heating with dry substances or by treating in alcoholic or benzene solution. Ammonia or hot soda solutions can also be employed in an analogous manner.

Instead of acetyl ester prescribed in the foregoing example the analogous products obtained according to the foregoing Examples 2, 3, and 4 can be similarly employed.

*Example 6. Conversion of the acetyl compound into indigo by means of sulfuric acid.*—Add one (1) part of the acetyl ester obtained according to the foregoing Example 1 to about five (5) parts of sulfuric acid containing a small quantity—say about four per cent.—of free sulfuric anhydride. Heat the mixture for a short time on the water-bath until no increase in the blue color formed can be observed. Pour the sulfuric-acid solution onto ice and precipitate the indigo sulfoacid by means of common salt. Instead of the sulfuric acid prescribed in this example monohydrate sulfuric acid can be employed or stronger fuming acids can be used; but the stronger the fuming acid is the greater must be the care taken that the temperature does not rise too high. Instead of the acetyl ester used in this example the other acyl compounds can be employed.

Now, what we claim is—

A process for the manufacture of indoxyl bodies by combining a di-alkyl ester of phenyl-glycocol-ortho-carboxylic acid with an acid radical and converting the resulting acyl derivative into an indoxyl body by treatment with a condensation agent substantially as hereinbefore described.

In testimony whereof we have hereunto set our hands in the presence of the subscribing witnesses.

DANIEL VORLÄNDER.
HENRY STALAY ARTHUR HOLT.
HEINRICH WEISSBRENNER.

Witnesses to the signature of Daniel Vorländer:
RUDOLPH FRICKE,
CHAS. J. BURT.

Witnesses to the signature of Henry Stalay Arthur Holt:
ERNEST G. EHRHARDT,
PERCY J. JONES.

Witnesses to the signature of Heinrich Weissbrenner:
HERNANDO DE SOTO,
PAUL ARRAS.